(12) United States Patent
Engelsiepen et al.

(10) Patent No.: US 8,290,996 B2
(45) Date of Patent: Oct. 16, 2012

(54) DATA SHARING FOR FILE CLONES USING REVERSE DITTO REFERENCES

(75) Inventors: Thomas Eugene Engelsiepen, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 12/847,724

(22) Filed: Jul. 30, 2010

(65) Prior Publication Data

US 2012/0030439 A1 Feb. 2, 2012

(51) Int. Cl.
*G06F 17/30* (2006.01)
(52) U.S. Cl. ........................................ 707/822; 711/162
(58) Field of Classification Search .................. 707/822; 711/162
See application file for complete search history.

(56) References Cited

U.S. PATENT DOCUMENTS

| 2003/0046260 A1 | 3/2003 | Satyanarayanan et al. |
| 2005/0246397 A1 | 11/2005 | Edwards et al. |
| 2009/0043978 A1 | 2/2009 | Sawdon et al. |
| 2009/0276593 A1 | 11/2009 | Jacobson et al. |
| 2009/0307450 A1 | 12/2009 | Lee |

OTHER PUBLICATIONS

PCT International Search Report; International Business Machines Corporation; PCT/EP2011/062482; Jul. 20, 2011; 4 pages.
Chutani, et al. "Proceedings of the Winter 1992 USENIX Conference,"USENIX Association, Jan. 20-24, 1992, San Francisco, California, 20 pages.

*Primary Examiner* — Neveen Abel Jalil
*Assistant Examiner* — Jagdish Pandya
(74) *Attorney, Agent, or Firm* — Yudell Isidore Ng Russell PLLC (57) ABSTRACT

A method, system, and computer program product for creating and implementing file clones using reverse ditto references. A clone inode is created as a copy of an original inode. The clone inode and the original inode are indistinguishable to an end user. Each additional file clone created spawns a clone inode. An immutable clone-parent inode is created that contains the disk block addresses, while writable clones inode instead contain dittos linking the clone inode to data blocks referenced in the clone-parent inode. Data block address links in the original inode are moved to the new clone-parent inode and dittos replace the original data block address links in the original inode. When a clone file is updated, the new data is written to a new disk location and a corresponding ditto in the clone inode is replaced with a data block link address, keeping the data of the clone-parent inode intact.

25 Claims, 10 Drawing Sheets

DATA SHARING FOR FILE CLONES USING REVERSE DITTO REFERENCES

BACKGROUND

1. Technical Field

The present invention relates in general to data processing systems and in particular to data and files in a data processing system. Still more particularly, the present invention relates to an improved method for implementing immutable data sharing file clones.

2. Description of the Related Art

Many files systems, including IBM's General Parallel File System (GPFS), support file system snapshots. File system snapshots are logical, point-in-time copies of a file system. Snapshots can be used for file system backup. Backing up data from a snapshot guarantees that file system content is preserved in a consistent state. Another common use of snapshots is to create regular snapshots and also by keeping some number of recent snapshots on-line, a user can retrieve a previous copy of a file that was deleted or overwritten accidentally.

Snapshots are typically implemented using a copy-on-write mechanism. Copy-on-write defers allocating disk space for a file in the snapshot until the original file is modified or deleted. This has the advantage that snapshot creation is very fast (no data is copied at the time the snapshot is created) and the disk space occupied by a snapshot is limited to the amount of data that was modified or deleted since the snapshot was created. GPFS implements copy-on-write using logical references, called "dittos". Dittos are stored in inodes and indirect blocks of files in a snapshot (instead of references to physical disk space) to indicate that the corresponding data or metadata in the original file have not yet been modified. When an original file is modified, dittos in a snapshot are replaced with references to copies of the original data. GPFS currently allows only for creating a snapshot of a whole file system. However, snapshots created in GPFS are read-only. Thus while a user can read snapshot files, the user cannot modify or delete files in a snapshot.

Additionally, a Data Management Application Programming Interface (DMAPI) may be deployed that enables a third party application to assist in disk space management in a file system. DMAPI applications function by moving infrequently accessed data to off-line storage. The infrequently used data may then be restored only when needed. A typical DMAPI application will not recognize snapshots. Thus, when snapshots are moved to off-line storage of a file system, there are substantial difficulties encountered with managing snapshots of that file system, as the snapshots may either need to be re-created because the snapshots have been moved or disassociated from the original files. Additionally, restoring a moved snapshot requires a substantial amount of additional disk space since the snapshot will then be modified to include updated data.

SUMMARY OF AN EMBODIMENT

Disclosed are a method, system, and computer program product for creating and implementing file clones using reverse ditto references. A clone inode is created as a copy of an original inode. The clone inode and the original inode are indistinguishable to an end user. Each additional file clone created spawns a clone inode. An immutable clone-parent inode is created that contains the disk block addresses, while a writable clone inode instead contains dittos linking the clone inode to data blocks referenced in the clone-parent inode. Thus, data block address links in the original inode are moved to the new clone-parent inode and dittos replace the original data block address links in the original inode. When a clone file is updated, the new data is written to a new disk location and a corresponding ditto in the clone inode is replaced with a data block link address, keeping the data of the clone-parent inode intact.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF AN ILLUSTRATIVE EMBODIMENT

The illustrative embodiments provide a method, system, and computer program product for implementing data sharing file clones using reverse ditto references, in accordance with one embodiment.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. Also, while generally described as being applicable to a file system, the functionality associated with the described embodiments applies to any kind of file system or any storage system that stores file-like objects, such as a data base or an object store. These systems may generally be referred to as a computer-implemented file storage and/or management facility.

Figure 1:
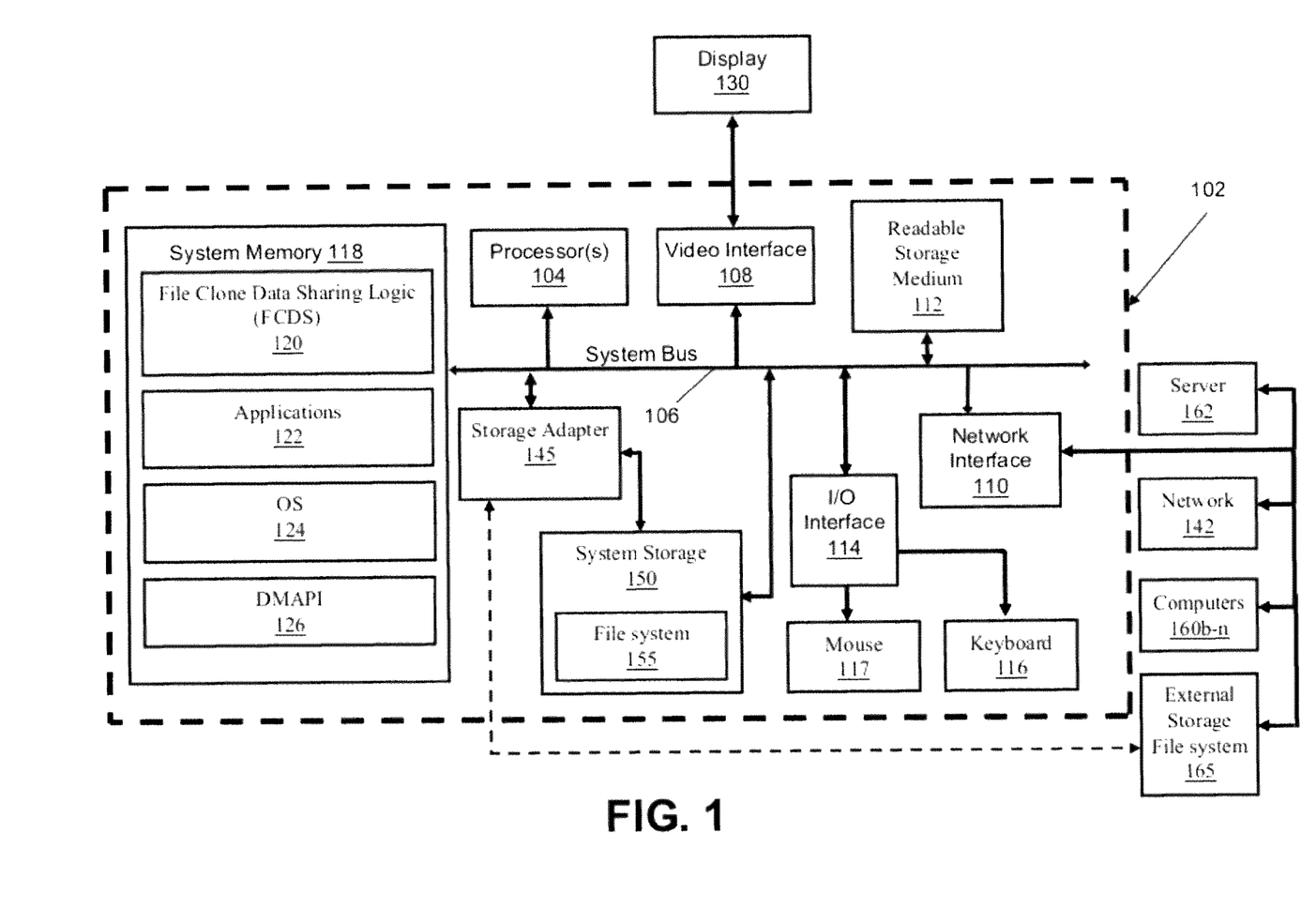
FIG. 1 is a block diagram of a data processing system in which the present invention may be implemented.

With reference now to FIG. 1, there is depicted a block diagram of a Data Processing System (DPS) 102 in which the present invention may be implemented. DPS 102 includes a processor(s) 104 that is coupled to a system bus 106. Processor(s) 104 may be a single processor, multi-core processor, or a multi-processor array. Video Interface 108, coupled to system bus 106, allows for the connection of a Display 130 to DPS 102 enabling the displaying of a user interface (including text and graphics) by a user of DPS 102. System bus 106 also enables communication with a hardware based readable storage medium 112 (e.g., Compact Disk-Read Only Memory (CD-ROM), flash drive memory). Input/Output (I/O) Interface 114, also connected to system bus 106, permits user interaction with DPS 102, such as data entry via keyboard 116 or mouse 117. DPS 102 also comprises system memory 118, which is connected to system bus 106. Illustrated within system memory 118 are a number of software/firmware/logic components, including operating system (OS) 124 (e.g., Microsoft Windows®, a trademark of Microsoft Corp, or GNU®/Linux®, registered trademarks of the Free Software Foundation and The Linux Mark Institute) and applications 122. System memory 118 may also include a Data Management Application Programming Interface (DMAPI) or DMAPI application 126, which enables another third party application (e.g., applications 122) to assist in disk space management in a file system. In one embodiment, DMAPI 126 enables the third party application to move infrequently accessed data to off-line storage. The infrequently used data may then be restored only when needed. As shown, system memory 118 also comprises File Clone Data Sharing (FCDS) Logic 120 for implementing the processes described in FIGS. 2-10. In one embodiment, DPS 102 is able to utilize executable code of FCDS Logic 120 in order to implement immutable file clones using reverse ditto references, as described in greater detail below in FIGS. 2-10. In one embodiment, FCDS logic may be provided within storage adapter 145. This embodiment is likely implemented when, or if, the filesets and their associated inodes are stored on internal storage 150 or external storage file system 165, which are made accessible via code executing within storage adapter 145.

DPS 102 also comprises system storage 150 coupled via a corresponding storage adapter 145. System storage 150 stores data/instructions/code for one or more applications. As illustrated, system storage 150 contains file system 155 within which is stored one or more filesets accessible via corresponding inodes/inode blocks. In one embodiment file system 155 is formatted in a general parallel file system (GPFS). Additionally, DPS 102 may also be connected to external storage file system 165 which provides external storage similar to internal system storage 150 but is instead connected to DPS 102 via storage adapter 145 or via network 142

DPS 102 is also illustrated with a network interface 110, by which DPS 102 may connect to one or more network accessible devices, such as external storage 165 or server 162. Access to these devices is via one or more networks 142. Network interface 110 may be configured to operate via wired/or wireless connection to an access point of the network 142. Network 142 may be an external network such as the Internet or wide area network (WAN), or an internal network such as an Ethernet (local area network—LAN) or a Virtual Private Network (VPN). When network 142 is an internal network, such as a LAN, connection to the external network (Internet) may be established with one or more servers (162), which may also provide data/instructions/code for use by or execution on DPS 102, in one embodiment.

In one embodiment, certain features associated with FCDS Logic 120 may be available via a software deploying server (e.g., server 162), and DPS 102 communicates with the software deploying server (162) via network 142 using network interface 110. Then, FCDS Logic 120 may be deployed from/on/across the network, via software deploying server (162). With this configuration, software deploying server (162) may perform all of the functions associated with the execution of FCDS logic 120. Accordingly, DPS 102 is not required to utilize internal computing resources of DPS 102 to execute FCDS Logic 120. Alternatively, software deploying server may enable DPS 102 to download the executable code required to implement the various features of the described embodiments.

As illustrated and described herein, DPS 102 may be a computer or computing device having the required hardware components and programmed with FCDS Logic 120, executing on the processor to provide the functionality of the described embodiments. The hardware elements depicted in DPS 102 are not intended to be exhaustive, but rather are representative to highlight essential components that may be utilized to implement the present invention. For example, different configurations of data processing systems/devices may be utilized containing other devices/components, which may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
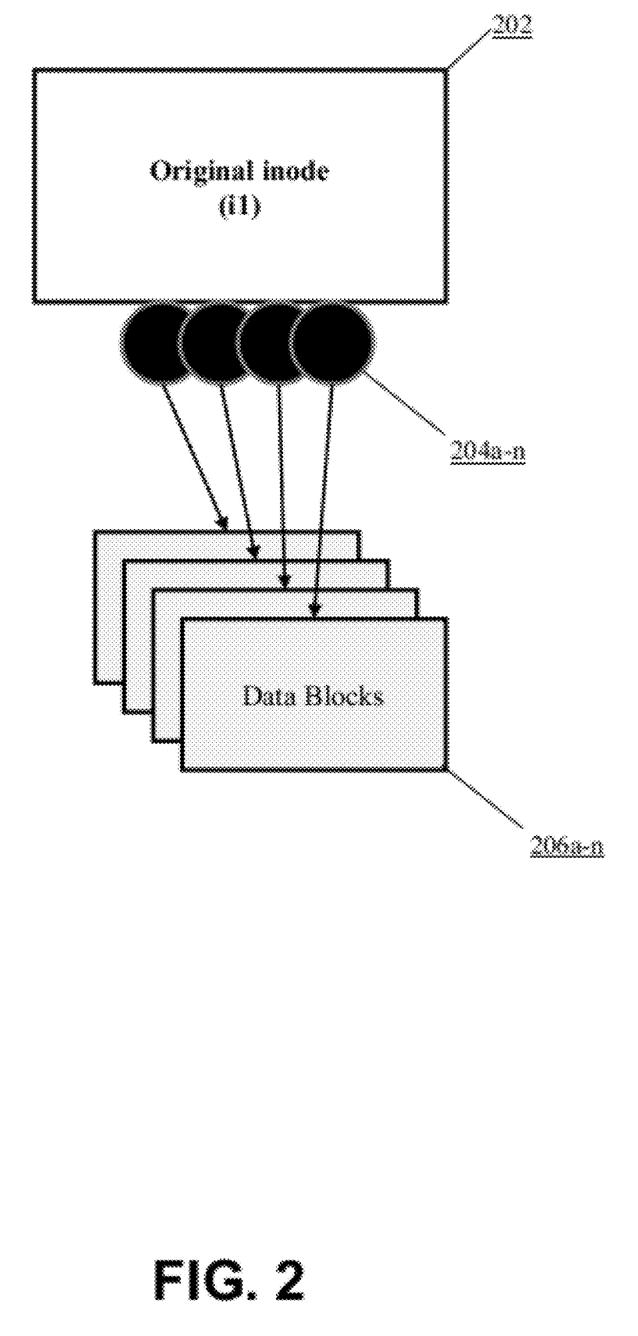
FIG. 2 is a block diagram illustration of an inode containing physical references to example data blocks on diskfile and inode association scheme, according to one embodiment.

With reference now to FIG. 2, there is depicted an illustration of an example data file and inode association scheme, according to one embodiment of the invention. As shown in FIG. 2, original inode (i1) 202 has associated therein data block address links 204a-n corresponding to a file stored in a memory of DPS 102. Data block address links 204a-n link original inode (i1) 202 to data blocks 206a-n. Data blocks 206a-n contain the targeted data of original inode (i1) 202 and may be called up by processor(s) 104 (FIG. 1) at any time.

Figure 3:
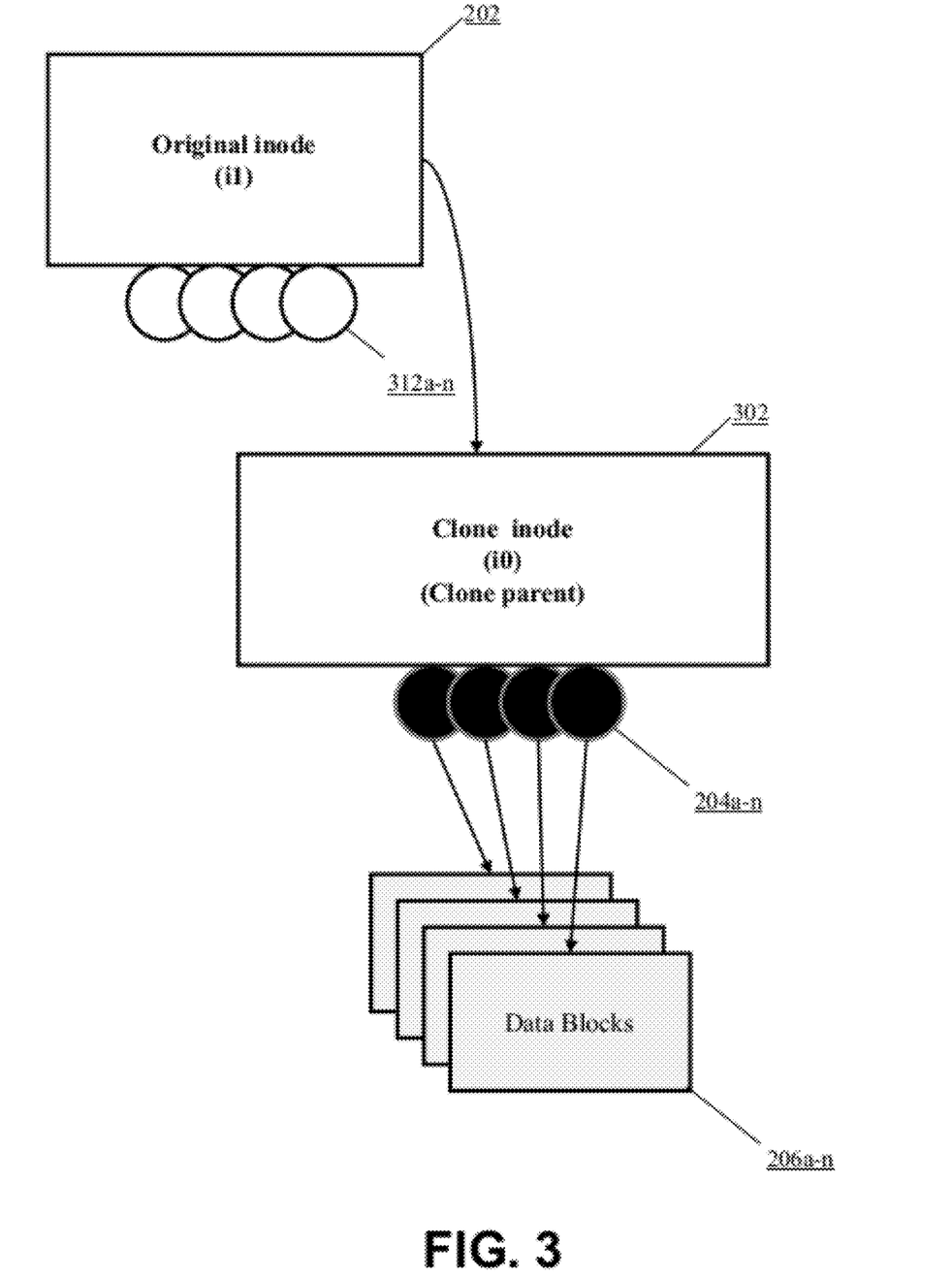
FIG. 3 is a block diagram illustration of a cloning scheme involving the original inode of FIG. 2, according to one embodiment.

With reference now to FIG. 3, there is depicted an illustration of a cloning scheme involving the original inode of FIG. 2, according to one embodiment of the invention. As shown, the cloning scheme provides that clone inode (i0) 302 has been created to be a snapshot clone parent of original inode (i1) 202. Clone inode (i0) 302 functions as an immutable file snapshot (clone-parent inode) that serves as a basis for subsequent file clones.

To create clone inode (i0) 302, logic of DPS 102 (such as FCDS Logic 120) first selects or receives a selection of a selected inode (original inode (i1) 202) corresponding to an original file and creates clone inode (i0) 302. The recorded creation time of clone inode (i0) 302 may be copied from original inode (i1) 202, or may be set based on the current time when clone inode (i0) 302 is created. Upon allocation of clone inode (i0) 302, the status of the clone inode (i0) 302 is set as created. A name for the new clone inode (i0) 302 can then be inserted. The name for clone inode (i0) 302 may be entered by a user of DPS 102 or may be autonomously assigned by logic (e.g., as FCDS Logic 120) running on DPS 102. In an alternate embodiment, a name for clone inode (i0) 302 may be provided by a computer 160a-n connected to DPS 102 via network 142. A target directory may also be provided by a user of DPS 102 or may be autonomously assigned by logic (e.g., as FCDS Logic 120) running on DPS 102. In response to receiving a name entry and target directory, clone inode (i0) 302 is inserted to the selected target directory and assigned the specified name entry.

After clone inode (i0) 302 has been created in the target directory and given a name, clone inode (i0) 302 is initialized as a clone-parent for original inode (i1) 202. Once initialized as a clone-parent, a clone-parent inode becomes an immutable copy of an original inode. The initialization process comprises the steps of: (1) copying the data block address links 204a-n and a header of original inode (i1) 202 to clone inode (i0) 302, (2) setting a link count in the clone inode (i0) 302 to 2, (3) copying inode time stamps and permission bits of original inode (i1) 202 to clone inode (i0) 302, (4) determining owner credentials of the clone inode (i0) 302, and (5) setting an owner field of clone inode (i0) 302 based on the determined owner credentials. In one embodiment, steps 1-5 may also be logged to make each of the steps atomic.

A link count is a count of the number of inodes that depend on that specific inode. For example, a cloned child inode with no clones of itself would have a link count of one, since it is only self-dependent. A parent inode with two child clones would have a link count of three (one count for itself, and two counts for the two dependent child clones). Since deleting a parent inode may cause substantial problems in a file system, deletion requests of inodes may be rejected if a requested deletion operation targets a parent inode. Thus, inodes with a link count greater than one may not be deleted (as a child inode still depends on an inode with a link count greater than one).

The owner credentials provide identification information for the owner of an inode. In one embodiment the owner credentials for a clone inode (i0) 302 may simply be identified and copied from original inode (i1) 202. In an alternate embodiment the owner credentials may be created autonomously based on a current user of DPS 102 or based on an executing process of DPS 102. Additionally, when the owner of clone inode (i0) 302 is different from an owner of original inode (i1) 202, a disk block quota of original inode (i1) 202 may be transferred to the owner of clone inode (i0) 302.

In response to completing the initialization of clone inode (i0) 302, original inode (i1) 202 is updated to reflect the changes. Since clone inode (i0) 302 is the new clone-parent for original inode (i1) 202, data block address links 204a-n, which were previously attached to original inode (i1) 202, have instead been moved to clone inode (i0) 302 (illustrated as data block address links 204a-n). The data blocks originally associated with original inode (i1) 202 are instead replaced with dittos 312a-n. Each ditto 312a-n corresponds to one of the data block address links 204a-n. A ditto is a reference stored in an inode or indirect block in a snapshot that allow multiple files to share the same disk space by redirecting read requests to a different file. Dittos indicate that the corresponding data or metadata in the original file has not yet been modified. Since dittos are only references to the original disk space, no additional system storage is required until the original inode is modified. In one embodiment, the address links of an immutable file (the clone parent) contain the disk block addresses, while the address links in a writable file (the clone file) contain dittos. The dittos point to the disk block address links stored in the clone parent. When a clone file is updated, the new data is written to a new disk location and the ditto in the clone is then replaced with an actual data block link address.

After replacing each of the data block address links 204a-n with dittos 312a-n, the block count of original inode (i1) 202 is set to zero. Original inode 202 is updated to be a child of clone inode (i0) 302, and an inode map is updated to identify the clone inode (i0) 302 as in-use. The block count of an inode identifies the number of data blocks stored in that inode. Since original inode (i1) 202 now contains only dittos 312a-n, the block count is zero. When original inode 202 is modified, the affected dittos are replaced with references to copies of the original data and the block count is incremented one for each additional ditto 312a-n replaced with a data block.

In one embodiment clone inode (i0) 302 is a new inode. However clone inode (i0) 302 may also be an existing inode that has been repurposed to be a clone of original inode (i1) 202. To repurpose an existing inode, a clone attribute must be first stored in the existing inode. The existing inode may then be marked as a clone parent.

In one embodiment, DPS 102 may have a Data Management Application Programming Interface (DMAPI) application (e.g., DMAPI 126) embodied therein and utilized for moving infrequently accessed data to off-line storage and transparently restoring the data when needed that is not be configured to properly manage cloned files. Since clone parents (e.g., clone inode (i0) 302) are immutable, the data that is being restored by invisible write to a ditto should be the same as what is still in the parent. This preserves clone files when migrated to/from off-line storage. In response to the DMAPI application moving one or more cloned files from the storage of the data processing system to offline storage and issuing a read of data in any cloned file, logic (e.g., as FCDS Logic 120) running on DPS 102 performs an invisible read of data indirectly linked via the dittos of the clone inode. In response to the DMAPI application issuing a write of data in any cloned file, the logic silently ignores the write if the write would cause one or more dittos of the clone inode to be overwritten. Additionally, in response to the DMAPI application migrating of the one or more cloned files to/from offline storage to the storage of the data processing system based on a last access time, the logic may autonomously update the last access time of the cloned inode to resolve disk addresses.

Figure 4:
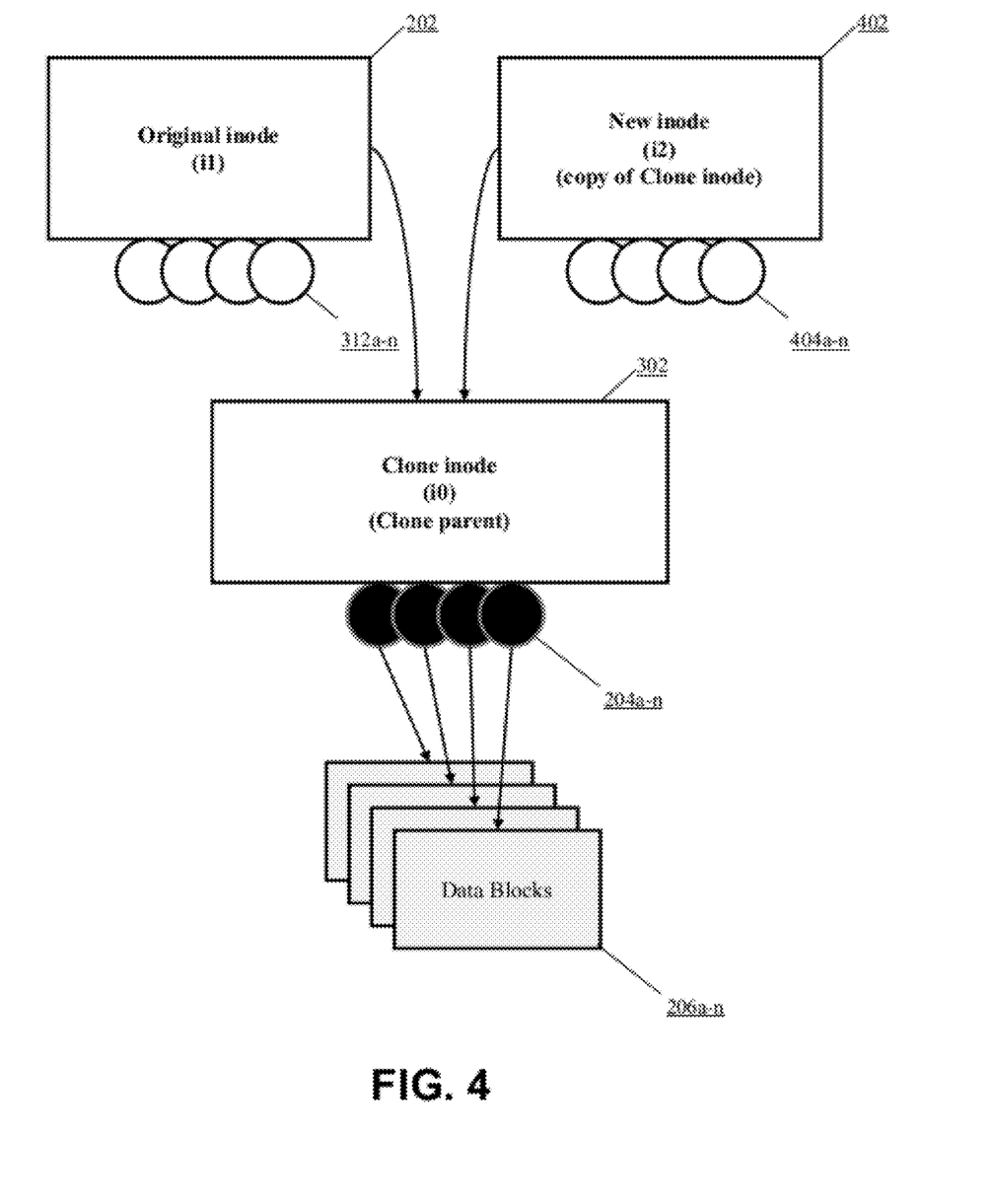
FIG. 4 is a block diagram illustrating the creation of a new clone inode of a clone parent inode, according to one embodiment.

With reference now to FIG. 4, there is depicted an illustration of original inode (i1) 202, cloned inode (i0) 302, and a new clone of clone inode (i0) 302, new inode (i2) 402, in accordance with one embodiment. Clone inode (i0) 302 is the immutable clone-parent of original inode (i1) 202, as presented in FIG. 3. New inode (i2) 402 has also been created to be a new clone of clone inode (i0) 302.

To create new inode (i2) 402, new inode (i2) 402 must first be allocated as a new clone inode. Name and target directories are also applied as previously detailed above. In response to receiving a new name entry and target directory for new inode (i2) 402, new inode (i2) 402 is inserted by the new name as a new entry in the selected target directory.

After new inode (i2) 402 has been created in the target directory and given a name, new inode (i2) 402 is initialized as a clone of clone inode (i0) 302. The initialization process comprises the steps of: (1) copying the header of clone parent (i0) 302 to new inode (i2) 402, (2) setting one or more dittos 404a-n corresponding to the one or more data block address links 204a-n stored in clone inode (i0) 302, (3) setting a link count in new inode (i2) 402 to 1, (4) setting the block count of new inode (i2) 402 to zero, and (5) recording clone inode (i0) 302 as the clone parent of new inode (i2) 402. In one embodiment, steps 1-5 may also be logged to make each of the steps atomic. Once new inode (i2) 402 is initialized, the link count of clone inode (i0) 302 is incremented by one and the inode map is updated to identify new inode (i2) 402 as in-use. The incrementing of the link count of clone inode (i0) 302 identifies clone inode (i0) 302 as the parent of another inode (in this case—new inode (i2) 402).

Figure 5:
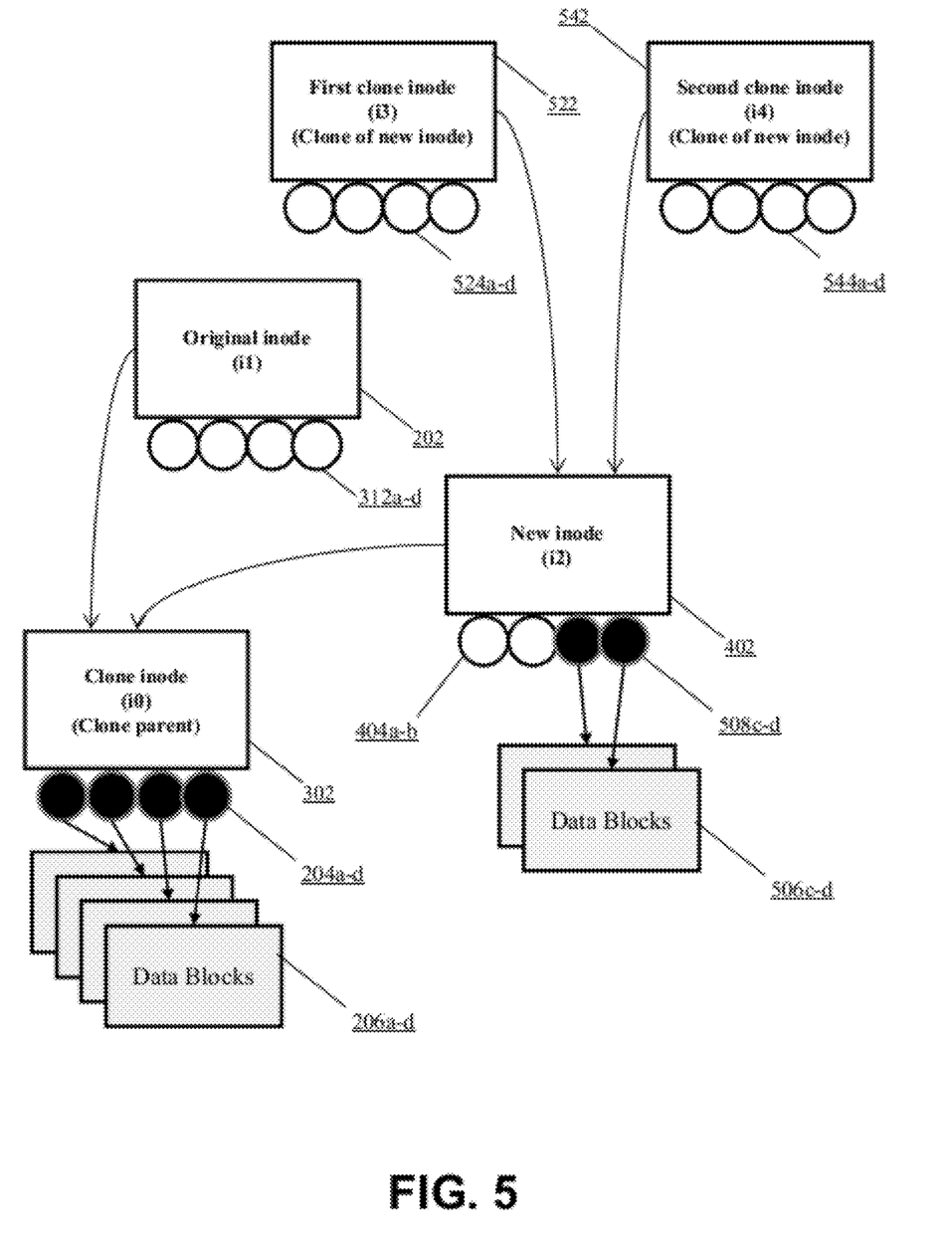
FIG. 5 is a block diagram illustrating the relationship of a clone-parent inode, an original inode functioning now as a clone inode of the clone-parent inode, a clone of the clone parent inode, and two clone inodes of the clone of the clone-parent inode, according to one embodiment.

With reference now to FIG. 5, there is depicted an illustration of an example embodiment featuring a clone-parent inode (clone inode (i0) 302), an original inode functioning now as a clone of the clone-parent inode (original inode (i1) 202), a clone of the clone parent inode (new inode (i2) 402), and two clones of the clone of the clone-parent inode (first clone inode (i3) 522 and second clone inode (i4) 542). FIG. 5 illustrates how both parent and clone inodes may be individually read or written. New inode (i2) 402 is also the parent inode of two clone child inodes—first clone inode (i3) 522 and second clone inode (i4) 542. Both first clone inode (i3) 522 and second clone inode (i4) 542 having dittos 524a-d and dittos 544a-d, respectively. Specifically, FIG. 5 illustrates original inode (i1) 202 having dittos 312a-d, clone inode (i0) 302 (which is the new clone parent of original inode 202) having data block address links 204a-d, and new inode (i2) 402 having two dittos 404a-b corresponding to data block address links 204a-b and two data block address links 508c-d. New inode (i2) 402 is a clone of clone inode (i0) 302.

As illustrated in the above example FIG. 5, new inode (i2) 402 has two dittos 404a-b corresponding to data block address links 204a-b of clone inode (i0) 302. Additionally, new inode (i2) 402 also comprises data block address links 508c-d, which point to data blocks 506c-d. This is a result of a target file of new inode (i2) 402 being modified where two dittos were affected. Instead of modifying the clone inode (i0) 302, the child dittos 404c-d were replaced with data block address links 508c-d which contain references to the updated data stored at data blocks 506c-d. Thus the data references of data block address links 204a-b remain untouched, preserving the clone snapshot.

Any modification of files linked by new inode (i2) 402 would affect dittos 524a-d and dittos 544a-d of first clone inode (i3) 522 and second clone inode (i4) 542, respectively. The result of such an operation is dittos 524a-b and dittos 544a-b still indirectly point to data block address links 204a-b, while dittos 524c-d and dittos 544c-d reference data block address links 508c-d. Dittos 312a-d of original inode (i1) 202, in contrast, still point to 204a-d, since original inode (i1) 202 has not been modified.

Figure 6:
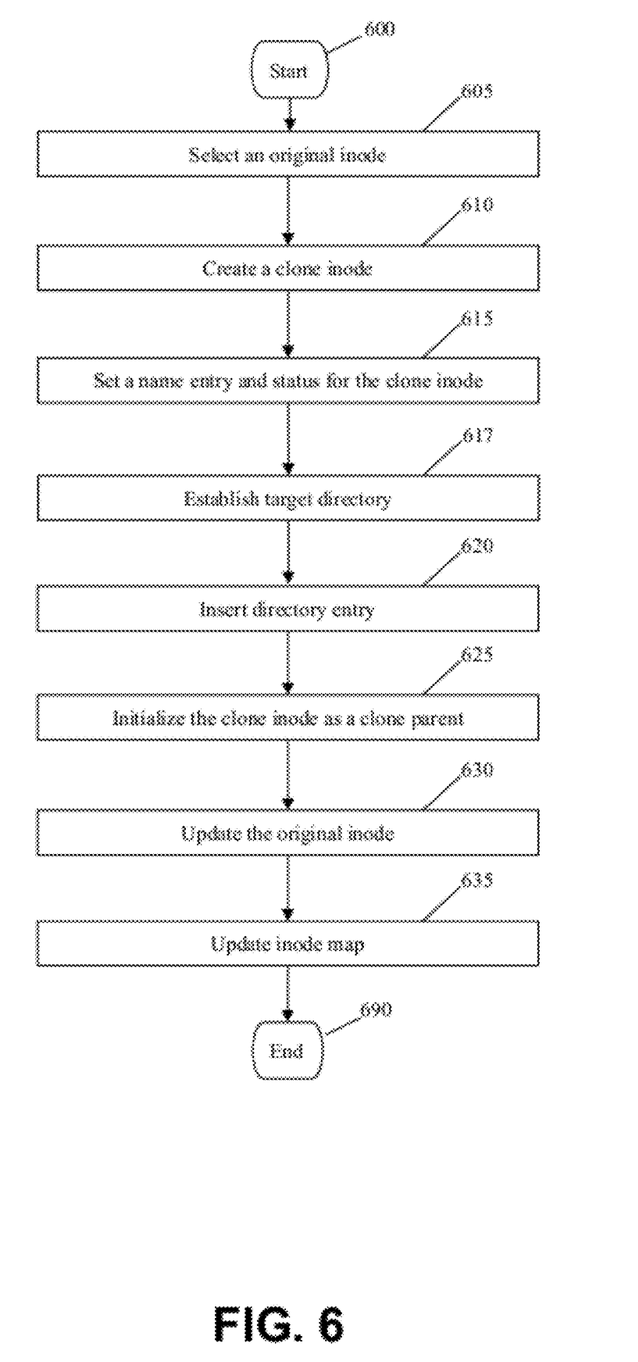
FIG. 6 is a high level logical flowchart of an exemplary process for creating a clone-parent inode of an original inode, according to one embodiment.

With reference now to FIG. 6, there is depicted a high level logical flowchart of an exemplary process for creating a clone-parent inode of an original inode, in accordance with one embodiment of the invention. As depicted, the process begins at block 600 and then proceeds to block 605, where an original inode is selected. Once the original inode is selected a clone inode intended to be the new clone-parent inode of the original inode is created (block 610). At block 615 a name entry and status for the clone inode are established. The status of the clone inode is set as clone-parent. Additionally, a desired target directory is established for the clone inode (block 617). The clone inode is then inserted, by the chosen name, as a directory entry in to selected target directory (block 620). At block 625 the clone inode is initialized as a clone parent. The initialization sub-steps performed in block 625 are more completely detailed in FIG. 7.

Once the clone inode has been initialized as a clone parent, the original inode is updated (block 630). The updating of the clone inode includes setting each of the one or more data block address links contained within the original inode to one or more dittos. The dittos indirectly address the one or more data block address links now stored in the clone inode (the new clone-parent inode). Since the original inode now contains no data block address links, the block count of the original inode is set to zero. At block 635 the inode map is updated to reflect the clone inode as the new clone-parent inode of the original inode. The process then terminates at block 690.

Figure 7:
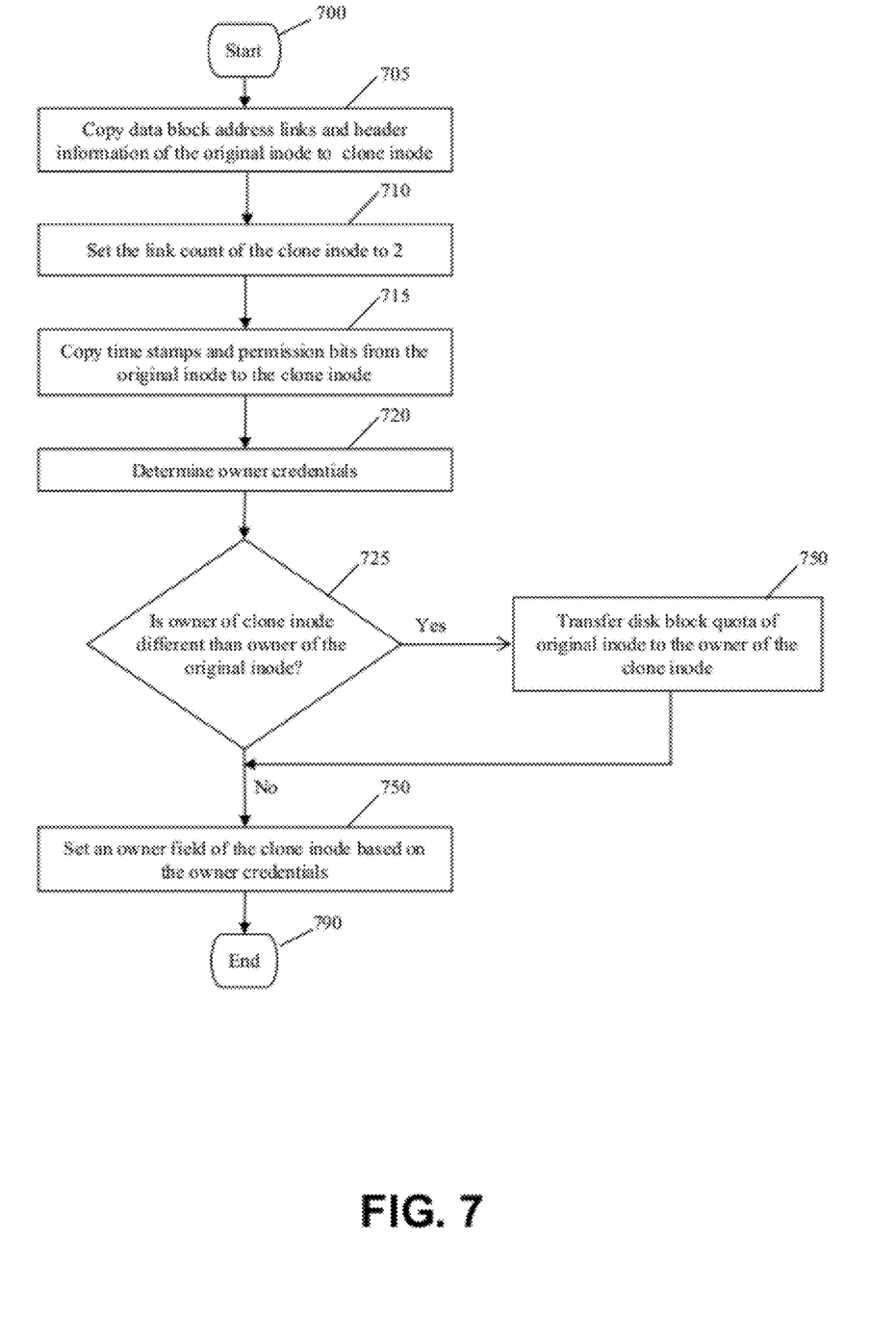
FIG. 7 is a high-level logical flowchart of the initializing a clone inode, according to one embodiment.

With reference now to FIG. 7, there is depicted a high level logical flowchart of the initialization of the clone inode referenced in block 625 of FIG. 6, in accordance with one embodiment of the invention. As depicted, the process begins at block 700 and then proceeds to block 705, where the data block address links and header information are copied to the clone inode from the original inode. The clone inode now contains the data previously stored within the original inode, and the link count of the clone inode is incremented (or set to 2), since both the clone inode and the original inode are now dependent on the new clone-parent inode (the clone inode) (block 710). At block 715, time stamps and permission bits from the original inode are copied to the clone inode, making the clone inode identical to the original inode that the clone inode replaces. The owner credentials of the clone inode are determined in block 720. The owner credentials may be the same as those of the original inode or may be those of a current user or executing process.

At block 725 a determination is made whether the owner of the clone inode is different than the owner of the original inode. When the owner of the clone inode is different from the owner of the original inode the disk block quota of the original inode is wholly transferred to the owner of the clone inode (block 750), and the process continues on to block 750. At block 750 the owner field of the clone inode is updated based on the previously identified owner credentials. The process then terminates at block 790.

Figure 8:
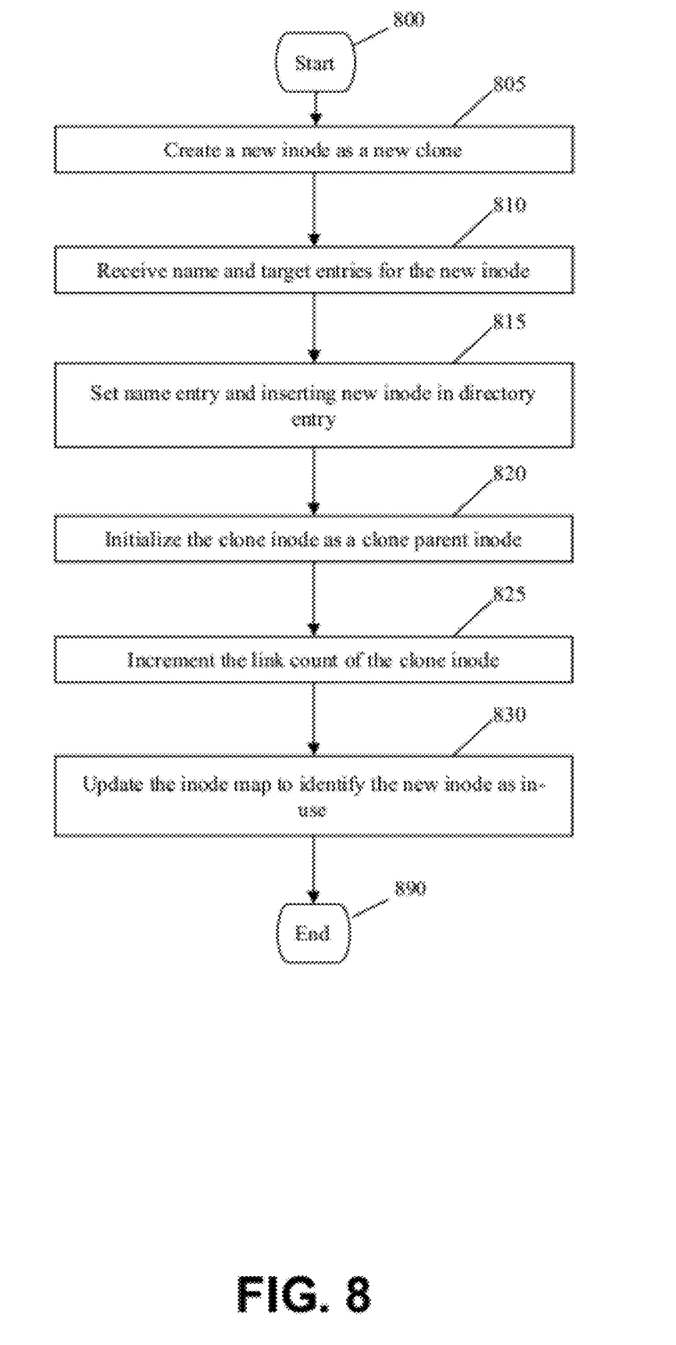
FIG. 8 is a high-level logical flowchart of the process for creating a new (third) clone inode of a clone-parent inode, according to one embodiment.

With reference now to FIG. 8, there is depicted a high level logical flowchart of an exemplary process for creating a new (third) clone inode of a clone-parent inode, in accordance with one embodiment. The process begins at block 800 where a new clone inode is created as a clone of the clone-parent inode. A name and target directory entry for the new clone inode is received from a user or executing process at block 810. At block 815 the name entry for the new clone inode is set, and the new clone inode is inserted in the target directory. At block 820 the new clone inode is initialized as a clone of the clone-parent inode. The initialization sub-steps performed in block 820 are more completely detailed in FIG. 9.

At block 825 the link count of the clone-parent inode is incremented since the clone-parent inode now has a new dependent inode (new clone inode). At block 830 the inode map is updated to reflect the status of the new clone inode as in-use. The process then terminates at block 890.

Figure 9:
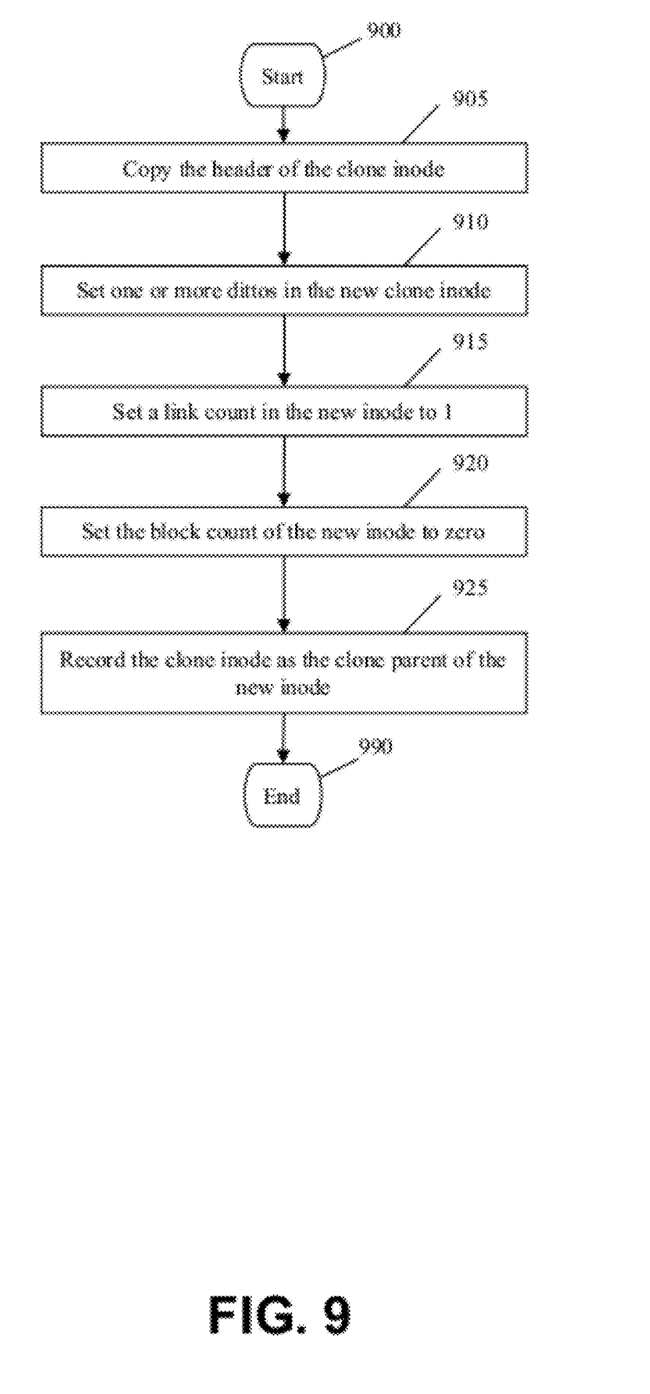
FIG. 9 is a high-level logical flowchart of the process for initializing a new clone inode, according to one embodiment.

With reference now to FIG. 9, there is depicted a high level logical flowchart of the initialization of the new clone inode performed in block 820, in accordance with one embodiment. As depicted, the process begins at block 900 and then proceeds to block 905 where the header from the clone-parent inode is copied to the new clone inode. At block 910 dittos are created in the new clone inode and are set to point to the data block address links of the clone-parent inode. The link count of the new clone inode is then set to 1, since the new clone inode is only dependent on itself (block 915). At block 920 the block count of the new clone inode is set to 0 since the new clone inode only contains dittos and does not yet store any data block address links. The clone-parent inode is then recorded as the clone-parent of the new clone inode within the new clone inode and the creation time of the new clone inode is set to the current time (block 925). The process then terminates at block 990.

Figure 10:
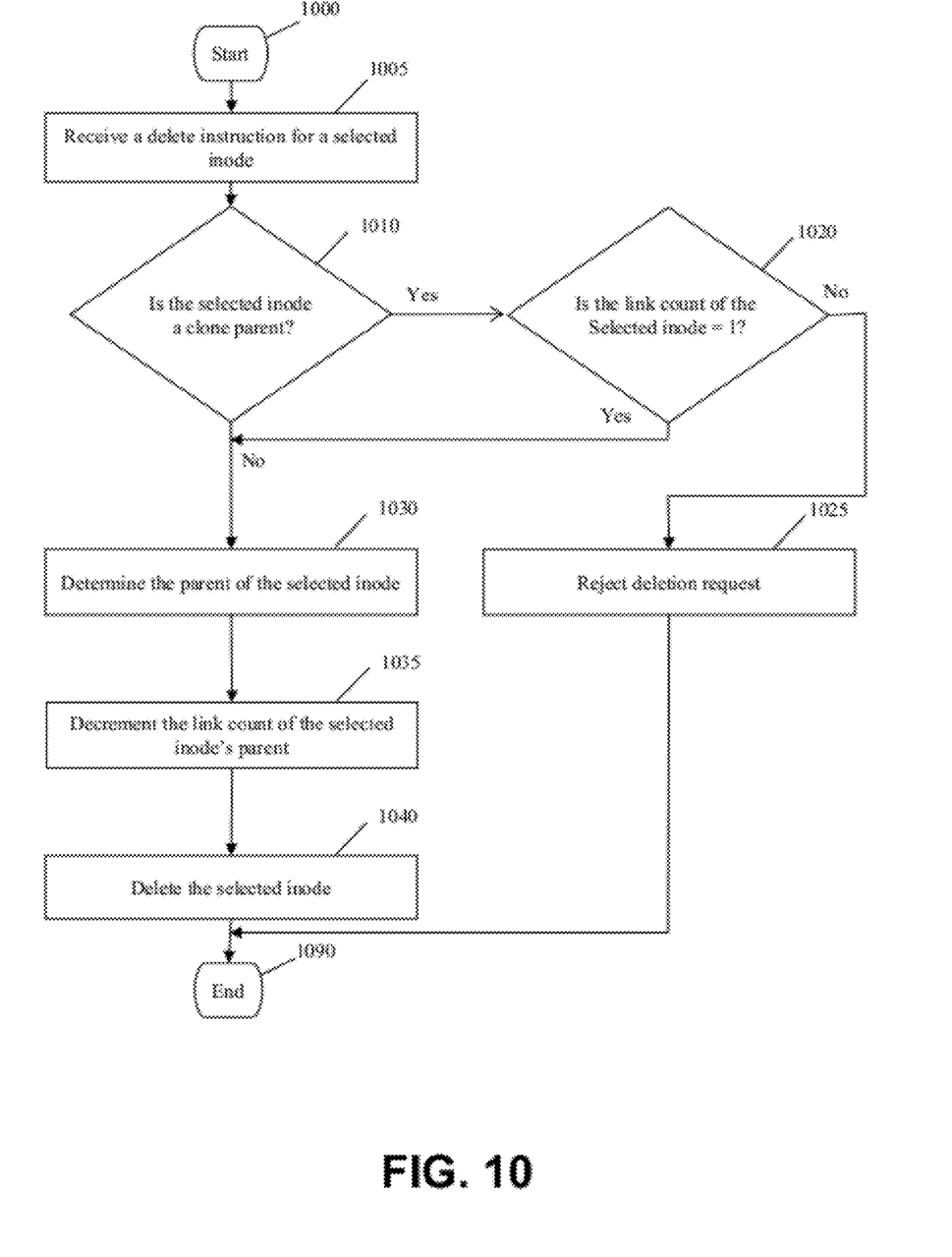
FIG. 10 is a high-level logical flowchart of the process for deleting a selected inode, according to one embodiment.

With reference now to FIG. 10, there is depicted a high level logical flowchart of the process for deleting a selected inode, in accordance with one embodiment. The process begins at block 1000 and the proceeds to block 1005 where a delete instruction is received for a selected inode. In response to receiving the delete instruction, a determination is made whether the selected inode is a clone parent (block 1010). When the selected inode is not a clone parent the process continues to block 1030.

When a selected inode is a clone-parent inode the process continues to block 1020 where a determination is made whether the clone-parent is still a parent to any child inodes. This determination is performed by reading the link count of selected inode and determining if the link count is equal to one (1). If the link count is not equal to one (1), the selected inode still has dependent clone children and the process continues to block 1025 where the deletion request is rejected. The process then terminates at block 1090. When the link count of the selected inode is equal to one (1), the process continues to block 1030.

At block 1030 the parent of the selected inode is determined. In response to determining the parent of the selected inode, the link count of the parent of the selected inode is decremented by one (block 1035). The link count of the parent of the selected inode is decremented since the selected inode is going to be deleted and is thus no longer dependent on its parent inode. At block 1040 the selected inode is deleted. The process then terminates at block 1090.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having a processor and access to a file storage and file management facility, a processor implemented method comprising:
   selecting an original inode corresponding to an original file, the original inode having one or more data block address links;
   creating a clone inode;
   receiving a name entry and target directory for the clone inode;
   in response to receiving the name entry, inserting a directory entry containing the name entry into the target directory;
   initializing the clone inode as a clone parent that is immutable by:
   copying the one or more data block address links and a header of the original inode to the clone inode;
   updating a block count of the clone inode to equal the number of data block address links, wherein the block count of the clone inode is a same number of data blocks as is stored in the original inode;
   setting a link count in the clone inode to two (2); and copying inode time stamps and permission bits of the original inode to the clone inode; and updating an inode map to identify the clone inode as in-use.

2. The method of claim 1, wherein initializing the clone inode as a clone parent further comprises:

determining owner credentials of a currently executing operation;

setting an owner field of the clone inode based on the owner credentials of the currently executing operation; and logging one or more initialization steps as an atomic transaction.

3. The method of claim 1, further comprising:

updating each of the one or more data block address links of the original inode to one or more dittos wherein the one or more dittos corresponds to the one or more data block address links and indicates that corresponding data or metadata in the original file has not yet been modified;

setting a block count of the original inode to zero, wherein the block count of the original inode represents a number of data block address links stored in the original inode; and recording the clone inode as the clone parent of the original inode.

4. The method of claim 1, further comprising:

identifying an owner of the clone inode;

determining if the owner of the clone inode is different from an owner of the original inode; and in response to the owner of the clone inode being different from the owner of the original inode, transferring a disk block quota of the original inode to the owner of the clone inode.

5. The method of claim 1, wherein the allocated clone inode points to an existing file, the method further comprising:

storing a clone attribute in the existing file; and marking the existing file as a clone parent.

6. The method of claim 1, further comprising:

allocating a new inode as a new clone;

receiving a new name entry and target directory for the new inode;

in response to receiving the new name entry and the target directory for the new inode, inserting a directory entry containing the new name entry into the target directory for the new inode;

initializing the new inode, wherein the initializing further comprises:

copying the header of the clone inode to the new inode;

setting one or more dittos for the one or more data block address links of the clone inode;

setting a link count of the new inode to one (1);

setting a block count of the new inode to zero;

recording the clone inode as the clone parent of the new inode; and setting a creation time of the new inode to a current time;

incrementing the link count of the clone inode; and updating the inode map to identify the new inode as in-use.

7. The method of claim 6, further comprising:

in response to receiving a deletion request for the new inode:

reading the link count of the clone inode;

in response to the link count of the clone inode being equal to one (1):

deleting the new inode, and decrementing the link count of the clone inode; and in response to the link count of the clone inode not being equal to one (1), ignoring the deletion request.

8. The method of claim 1, further comprising in response to receiving a new data update to the original file:

replacing the dittos of the original inode with links to copies of the original data blocks;

updating the original inode with the new data update; and updating the block count of the original inode.

9. The method of claim 1, further comprising:

in response to a Data Management Application moving the one or more cloned files from the storage of the data processing system to offline storage and issuing a read of data in any cloned file, performing an invisible read of data indirectly linked via the dittos of the clone inode;

in response to the Data Management Application issuing a write of data in any cloned file, silently ignoring the write if the write would cause one or more dittos of the clone inode to be overwritten; and in response to the Data Management Application requesting migration of the one or more cloned files from the offline storage to the storage of the data processing system based on a last access time, autonomously updating the last access time of the cloned inode.

10. A data processing system, comprising:

a local processor;

a file storage and a file management facility accessible to the local processor; and processing logic executing on the processor for enabling the data processing system to perform the functions of:

selecting an original inode corresponding to an original file, the original inode having one or more data block address links;

creating a clone inode;

receiving a name entry and target directory for the clone inode;

in response to receiving the name entry, inserting a directory entry containing the name entry into the target directory;

initializing the clone inode as a clone parent that is immutable by:

copying the one or more data block address links and a header of the original inode to the clone inode;

updating a block count of the clone inode to equal the number of data block address links, wherein the block count of the clone inode is a same number of data blocks as is stored in the original inode;

setting a link count in the clone inode to two (2);

copying inode time stamps and permission bits of the original inode to the clone inode; and updating an inode map to identify the clone inode as in-use.

11. The data processing system of claim 10, wherein initializing the clone inode as a clone parent further comprises processing logic for:

determining owner credentials of a currently executing operation;

setting an owner field of the clone inode based on the owner credentials of the currently executing operation; and logging one or more initialization steps as an atomic transaction.

12. The data processing system of claim 10, the processing logic further comprising logic for:

updating each of the one or more data block address links of the original inode to one or more dittos wherein the one or more dittos corresponds to the one or more data block address links and indicates that corresponding data or metadata in the original file has not yet been modified;

setting a block count of the original inode to zero, wherein the block count of the original inode represents a number of data block address links stored in the original inode; and recording the clone inode as the clone parent of the original inode.

13. The data processing system of claim 10, the processing logic further comprising logic for:

identifying an owner of the clone inode;

determining if the owner of the clone inode is different from an owner of the original inode; and in response to the owner of the clone inode being different from the owner of the original inode, transferring a disk block quota of the original inode to the owner of the clone inode.

14. The data processing system of claim 10, wherein the allocated clone inode points to an existing file, the processing logic further comprising logic for:

storing a clone attribute in the existing file; and marking the existing file as a clone parent.

15. The data processing system of claim 10, the processing logic further comprising logic for:

allocating a new inode as a new clone;

receiving a new name entry and target directory for the new inode;

in response to receiving the new name entry and the target directory for the new inode, inserting a directory entry containing the new name entry into the target directory for the new inode;

initializing the new inode, wherein the initializing further comprises:

copying the header of the clone inode to the new inode, setting one or more dittos for the one or more data block address links of the clone inode, setting a link count of the new inode to one (1), setting a block count of the new inode to zero, recording the clone inode as the clone parent of the new inode, and setting a creation time of the new inode to a current time;

incrementing the link count of the clone inode; and updating the inode map to identify the new inode as in-use.

16. The data processing system of claim 15, the processing logic further comprising logic for in response to receiving a deletion request for the new inode:

reading the link count of the clone inode;

in response to the link count of the clone inode being equal to one (1):

deleting the new inode, and decrementing the link count of the clone inode; and in response to the link count of the clone inode not being equal to one (1), ignoring the deletion request.

17. The data processing system of claim 10, the processing logic further comprising logic for in response to receiving a new data update to the original file:

replacing the dittos of the original inode with links to copies of the original data blocks;

updating the original inode with the new data update; and updating the block count of the original inode.

18. The data processing system of claim 10, the processing logic further comprising logic for:

in response to a Data Management Application moving the one or more cloned files from the storage of the data processing system to offline storage and issuing a read of data in any cloned file, performing an invisible read of data indirectly linked via the dittos of the clone inode;

in response to a Data Management Application issuing a write of data in any cloned file, silently ignoring the write if the write would cause one or more dittos of the clone inode to be overwritten; and in response to a Data Management Application requesting migration of the one or more cloned files from the offline storage to the storage of the data processing system based on a last access time, autonomously updating the last access time of the cloned inode.

19. A tangible computer-readable storage device having a plurality of instructions processable by a machine embodied therein, wherein the plurality of instructions, when processed by the machine, cause the machine to perform a method, the method comprising:

selecting an original inode corresponding to an original file, the original inode having one or more data block address links;

creating a clone inode;

receiving a name entry and target directory for the clone inode;

in response to receiving the name entry, inserting a directory entry containing the name entry into the target directory;

initializing the clone inode as a clone parent that is immutable by:

copying the one or more data block address links and a header of the original inode to the clone inode, updating a block count of the clone inode to equal the number of data block address links, wherein the block count of the clone inode is a same number of data blocks as is stored in the original inode, setting a link count in the clone inode to two (2), copying inode time stamps and permission bits of the original inode to the clone inode; and updating an inode map to identify the clone inode as in-use.

20. The tangible computer-readable storage device of claim 19, the initializing the clone inode as a clone parent further comprising:

determining owner credentials of a currently executing operation;

setting an owner field of the clone inode based on the owner credentials of the currently executing operation; and logging one or more initialization steps as an atomic transaction.

21. The tangible computer-readable storage device of claim 19, the plurality of instructions further comprising instructions for:

updating each of the one or more data block address links of the original inode to one or more dittos wherein the one or more dittos corresponds to the one or more data block address links and indicates that corresponding data or metadata in the original file has not yet been modified;

setting a block count of the original inode to zero, wherein the block count of the original inode represents a number of data block address links stored in the original inode; and recording the clone inode as the clone parent of the original inode.

22. The tangible computer-readable storage device of claim 19, the plurality of instructions further comprising instructions for:

in response to the allocated clone inode pointing to an existing file:

storing a clone attribute in the existing file, and marking the existing file as a clone parent;

identifying an owner of the clone inode;

determining if the owner of the clone inode is different from an owner of the original inode; and in response to the owner of the clone inode being different from the owner of the original inode, transferring a disk block quota of the original inode to the owner of the clone inode.

23. The tangible computer-readable storage device of claim 19, the plurality of instructions further comprising instructions for:
- allocating a new inode as a new clone;
- receiving a new name entry and target directory for the new inode;
- in response to receiving the new name entry and the target directory for the new inode, inserting a directory entry containing the new name entry into the target directory for the new inode;
- initializing the new inode, wherein the initializing further comprises:
  - copying the header of the clone inode to the new inode,
  - setting one or more dittos for the one or more data block address links of the clone inode,
  - setting a link count of the new inode to one (1),
  - setting a block count of the new inode to zero,
  - recording the clone inode as the clone parent of the new inode, and
  - setting a creation time of the new inode to a current time;
- incrementing the link count of the clone inode;
- updating the inode map to identify the new inode as in-use; and
- in response to receiving a deletion request for the new inode:
  - reading the link count of the clone inode,
  - in response to the link count of the clone inode being equal to one (1):
    - deleting the new inode, and
    - decrementing the link count of the clone inode, and
  - in response to the link count of the clone inode not being equal to one (1), ignoring the deletion request.

24. The tangible computer-readable storage device of claim 19, the plurality of instructions further comprising instructions for, in response to receiving a new data update to the original file:
- replacing the dittos of the original inode with links to copies of the original data blocks;
- updating the original inode with the new data update; and
- updating the block count of the original inode.

25. The tangible computer-readable storage device of claim 19, further comprising instructions for:
- in response to a Data Management Application moving the one or more cloned files from the storage of the data processing system to offline storage and issuing a read of data in any cloned file, performing an invisible read of data indirectly linked via the dittos of the clone inode;
- in response to a Data Management Application issuing a write of data in any cloned file, silently ignoring the write if the write would cause one or more dittos of the clone inode to be overwritten; and
- in response to a Data Management Application requesting migration of the one or more cloned files from the offline storage to the storage of the data processing system based on a last access time, autonomously updating the last access time of the cloned inode.

* * * * *